US006744543B1

(12) United States Patent
Keithley

(10) Patent No.: US 6,744,543 B1
(45) Date of Patent: Jun. 1, 2004

(54) SYSTEM AND METHOD FOR SCANNING A DOCUMENT

(75) Inventor: Douglas G. Keithley, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/437,356

(22) Filed: Nov. 10, 1999

(51) Int. Cl.⁷ .............................. H04N 1/46; H04N 1/04; G03B 42/08; G01N 23/04
(52) U.S. Cl. ...................... 358/514; 358/509; 358/475; 250/586; 250/584
(58) Field of Search ................................. 358/514, 509, 358/475; 250/586, 584

(56) References Cited

U.S. PATENT DOCUMENTS

| 4,574,311 | A | * | 3/1986  | Resnikoff et al. | 348/315  |
|-----------|---|---|---------|------------------|----------|
| 4,602,289 | A | * | 7/1986  | Sekine           | 348/315  |
| 4,712,134 | A | * | 12/1987 | Murakami         | 358/482  |
| 4,891,690 | A | * | 1/1990  | Hasegawa et al.  | 358/75   |
| 4,994,907 | A | * | 2/1991  | Allen            | 358/512  |
| 5,191,202 | A |   | 3/1993  | Kitamura et al.  |          |
| 5,757,040 | A | * | 5/1998  | Saito et al.     | 257/232  |
| 6,108,461 | A | * | 8/2000  | Haga             | 382/312  |
| 6,278,101 | B1 | * | 8/2001  | Puyot           | 250/208.1 |
| 6,326,636 | B1 | * | 12/2001 | Isoda et al.    | 250/586  |
| 6,344,906 | B1 | * | 2/2002  | Gatto et al.    | 358/443  |

* cited by examiner

Primary Examiner—Edward Coles
Assistant Examiner—Houshang Safaipour

(57) ABSTRACT

A system and method in a scanner for acquiring a number of sensor spots to create a digital image therefrom are provided. The system comprises a plurality of light sources positioned to project an amount of light at a scan target. The light sources are preferably red, blue, and green. The system also includes a contact image sensor positioned to receive an amount of reflected light from the scan target. The contact image sensor includes a number of sensors arranged in a nonlinear pattern. The scan target is moved relative to the contact image sensor or vice versa during the scan operation using suitable apparatus. The light sources are alternatively illuminated to obtain sensor spots from the scan target via the sensors. The sensor spots are stored in memory and an image is generated therefrom.

12 Claims, 5 Drawing Sheets

SYSTEM AND METHOD FOR SCANNING A DOCUMENT

TECHNICAL FIELD

The present invention is generally related to electrical scanning and imaging technology and, more particularly, is related to a system and method for scanning documents into electrical format using contact image sensors.

BACKGROUND OF THE INVENTION

Current scanning technology now facilitates scanning of color documents and the like to create a digital document therefrom. The digital document may then be displayed on an appropriate display device such as a cathode ray tube (CRT), etc. Computer systems provide significant flexibility to users to manipulate or change a digital document in a myriad of ways.

In order to generate the digital document from a hardcopy document, sensors are generally employed in conjunction with a number of colored lights. A hardcopy document is typically run through a scanner at a slow speed while the scanner acquires a dense pattern of sensor spots from the document by manipulating the colored lights and sampling values on the sensors. To acquire full color digital images, each of the sensor spots is preferably sampled multiple times, each time the sensor spot being exposed to light of a different color. The color of the lights used may be, for example, red, blue, and green.

The sensors employed are quite dense, even up to 600 sensors per inch. Thus, it takes a significant amount of time to sense each color for each sensor spot on the scan target as there is a significant amount of data created that must be processed and stored.

SUMMARY OF THE INVENTION

In light of the foregoing, the present invention provides a system in a scanner for acquiring a number of sensor spots to create a digital image therefrom and an accompanying method. In one embodiment, the system comprises a plurality of light sources positioned to project an amount of light at a scan target. The light sources are preferably red, blue, and green. The system also includes a contact image sensor positioned to receive an amount of reflected light from the scan target. According to an embodiment of the present invention, the contact image sensor includes a number of sensors arranged in a nonlinear pattern. The scan target is moved relative to the contact image sensor or vice versa during the scan operation using suitable apparatus. The light sources are alternatively illuminated to obtain sensor spots from the scan target via the sensors. The sensor spots are stored in memory, and an image is generated therefrom.

The present invention also provides a method for acquiring a number of sensor spots from a scan target to create a digital image. Broadly defined, the method comprises the steps of: projecting an amount of light from one of a number of light sources at a scan target; and receiving an amount of reflected light from the scan target in a contact image sensor having a number of sensors arranged in a nonlinear pattern.

The contact image sensor of the present invention with the nonlinear pattern of sensors provides a distinct advantage in that a color artifact associated with the use of linear sensors is substantially reduced or eliminated.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
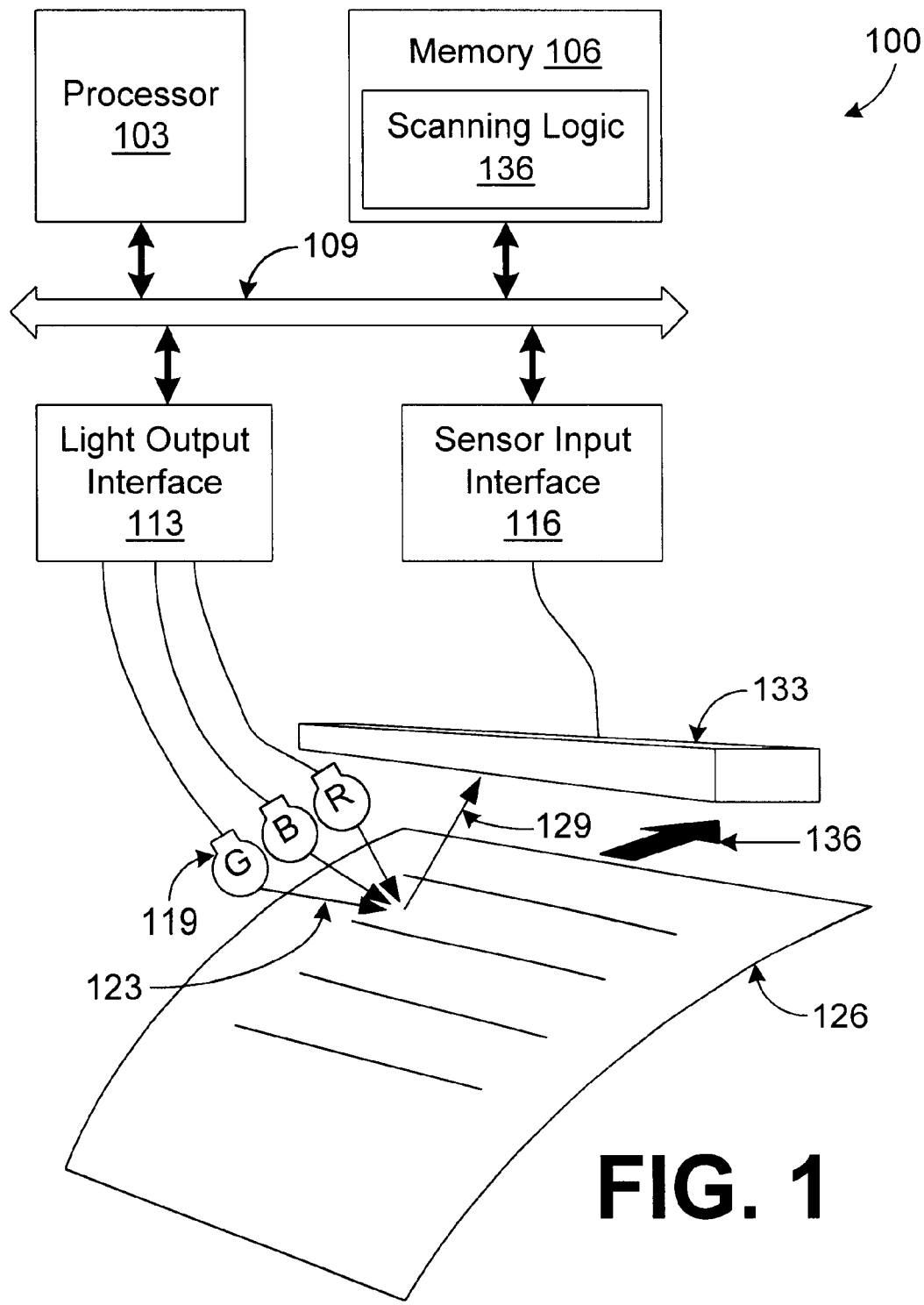
FIG. 1 is a schematic diagram of a scanning system according to an embodiment of the present invention.

Turning to FIG. 1, shown is a scanning system 100 according to an embodiment of the present invention. The scanning system 100 includes a processor 103 and a memory 106 that are both electrically coupled to a local interface 109 for facilitating communications therebetween. The local interface 109 may comprise, for example, a data bus and a control bus. The scanning system 100 also includes a light output interface 113 and a sensor input interface 116 that are also electrically coupled to the local interface 109. The light output interface 113 is electrically coupled to a number of light sources 119, such as light emitting diodes or other suitable light sources.

The light sources 119 generate light of a predetermined color to facilitate color scanning of documents and the like. For example, the light produced by the light sources 119 is red R, blue B, and green G, although other colors may be employed. The colored light 123 produced by the light sources 119 illuminate a scan target 126 such as a document, etc. Reflected light 129 leaves the scan target 126 and is received by a contact image sensor (CIS) 133 as the scan target 126 is fed past the CIS 133 in a scanning motion 136. The CIS 133 is positioned so that a number of individual sensors thereon receive the reflected light. The CIS 133 produces sensor spot information from the sensors in the CIS 133 regarding the scan target 126 that is made available to the local interface 109 via the sensor input interface 116. Note that the light sources 119 are shown separate from the CIS 133 to facilitate the discussion herein. However, the light sources 119 may actually reside at locations within the CIS 133.

During the operation of the scanning system 100, scanning logic 136 stored in the memory 106 is executed by the processor 103. The scanning logic 136 controls the illumination of the light sources 119 and other scanning functions. Also, during the scan operation, the scan target 126 may be fed in the scanning motion 136 across the CIS 133. Alternatively, the CIS 133 may be scanned across a stationary scan target 126. The apparatus necessary to create the scanning motion 136 on the part of the scan target 126 or the CIS 133 is also controlled by the scanning logic 136 and is generally known by those skilled in the art and is not discussed in detail herein.

Figure 2:
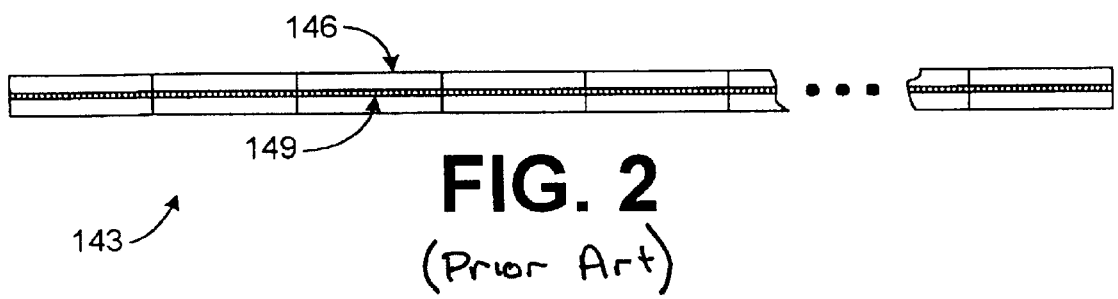
FIG. 2 is a block diagram of a linear contact image sensor according to the prior art.

With reference to FIG. 2, shown is a linear CIS 143 according to the prior art. The linear CIS 143 comprises a number of linear sensor integrated circuits 146 that are lined up end-to-end. Each of the linear sensor integrated circuits 146 includes a number of sensors 149 that are arranged in a linear row as shown. At a given instant, each sensor 149 is sampled to obtain color information for a given sensor spot on the scan target 126 as it passes by the CIS 149. The CIS 143 may provide resolutions of significant density such as, for example, approximately 600 sensors 149 per inch and greater. The sensors 149 are squares having side dimensions of approximately $\frac{1}{600}^{th}$ of an inch or lesser, although it is understood that other shapes such as rectangles or circles, etc., may be employed as well.

Referring back to FIG. 1, the scanning system 100 provides a means for scanning color images on the scan target 126, thereby creating a digital document with the color images contained on the scan target 126. As the scan target 126 is slowly scanned across the CIS 133, the light sources 119 are alternatively illuminated in quick succession so that color information from all three light sources 119 is obtained for a given scan spot on the scan target 126. Thus, as the scan target 126 progresses, a particular light source 119 is illuminated and the reflected light 129 received by the sensors in the CIS 133 is stored in the memory 106. Given that the sensors 149 are arranged in a row along the CIS 143, the sensors 149 are generally sampled one row at a time, three colors for each row.

This procedure is repeated for all of the rows of sensor spots of the scan target 126 as it passes by the CIS 143. This means that there is a lot of color information that is sampled and stored in a given moment of time to ensure that information relative to all three colors is received and processed. Consequently, the scan target 126 moves at a very slow rate across the CIS 133 taking a significant amount of time for processing. However, as will be seen, it is possible that faster scan speeds may be achieved at a cost of lower resolution.

Figure 3:
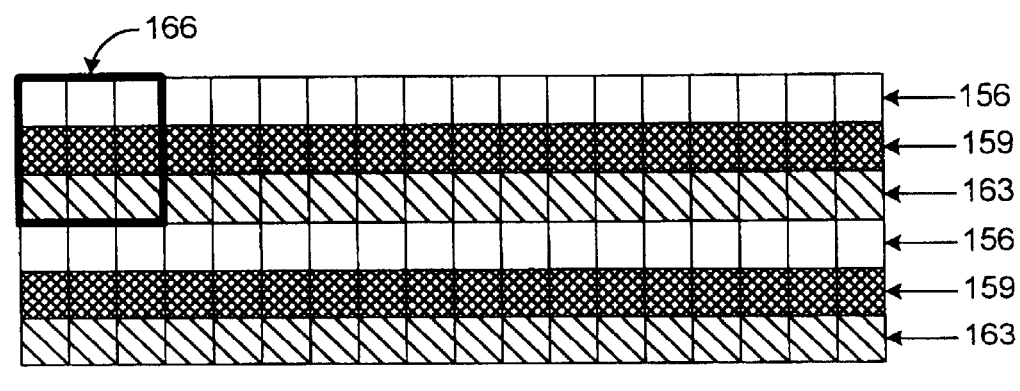
FIG. 3 is a drawing of a linear pattern of sensor spots produced by the contact image sensor of FIG. 2.

Turning then, to FIG. 3, shown is a grid of sensor spots 153 that make up, for example, a portion of an image obtained using the linear CIS 143 of FIG. 2. Rather than illuminating all three light sources 119 for each linear row of sensor spots 153 to obtain all three colors for each sensor spot 153 in the row, only one of the three light sources 119 is illuminated for each row of sensor spots 153 on the scan target 126. This results in a pattern of sensor spots 153 having a red row 156, a blue row 159, and a green row 163 that is repeated along the entire scan target 126. Since only one of the three colors is taken for a given row of sensor spots 153 on the scan target 126, then the scan target may be moved at three times the speed of a comparable system that takes all three colors for a specific row of sensor spots 143. When scanning in this manner, the resolution of the resulting image is reduced by one third. This is because the color information from a square of nine sensor spots 153 are used to generate a pixel 166 of the resulting image. In generating the pixel, the red, blue, and green color information from the respective red, blue, and green sensor spots 153 is averaged out for the entire pixel 166.

Figure 4:
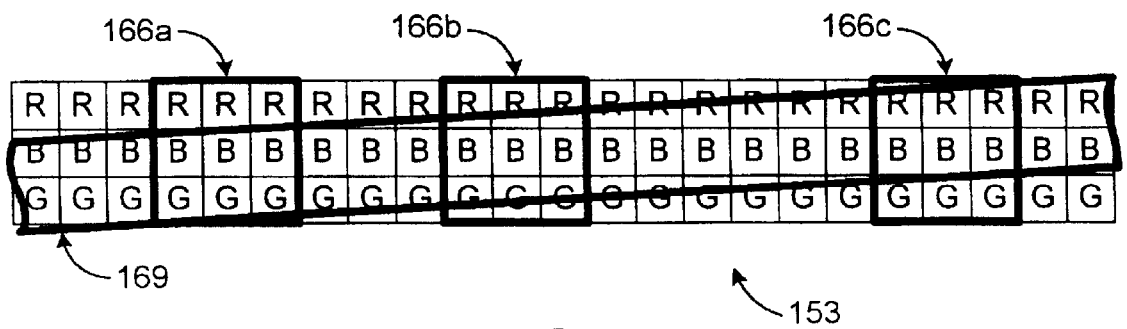
FIG. 4 is a drawing of a color artifact created by the linear contact image sensor of FIG. 2.

With reference to FIG. 4, shown is a portion of the grid of sensor spots 153 of FIG. 3. The sensor spots 153 are labeled "R" for red, "B" for blue, and "G" for green that indicate the color sensed therefrom, although it may be possible to use other colors as well. Interposed on top of the sensor spots 153 is an outline of a black line 169 that is disposed on a scan target 126 (FIG. 1). Only the edges of the black line 169 are indicated for purposes of illustrating a particular problem with the linear arrangement of the sensors 149 (FIG. 2) on the linear CIS 143(FIG. 1). Given that the black line is solid, there will generally be little or no reflected light 129 (FIG. 1) for each colored light source 119 (FIG. 1) as known in the art. Thus, black as a color is generally indicated when the red, blue, and green components of a particular sensor spot 153 are approximately zero or are very low. However, the black line 169 may be slightly diagonal relative to the rows of sensor spots 153, such as is the case for a horizontal line on a scan target 126 that is scanned in a slightly skewed manner. If this is the case, then a particular pixel 166 may obtain color information from one of the rows whereas the others may be excluded due to the relative position of the black line 169.

As seen in FIG. 4, for the pixel 166*a*, the black line 169 is sampled in the blue B and green G sensor spots 153, but not the red R. In the pixel 166*b*, the black line 169 is sampled by all of the sensor spots 153 but a portion of the red R and green G. In the final pixel 166*c* is sampled primarily by the red R and blue B sensor spots, but not the green G. In the resulting image, the black line 169 appears as a number of colors due to the skewed color acquisition. Note if the black line 169 were perfectly horizontal so that it was parallel with the row of sensors 149, then it still may only be sampled by two of the three color rows resulting in a line of uniform color other than black.

Figure 5:
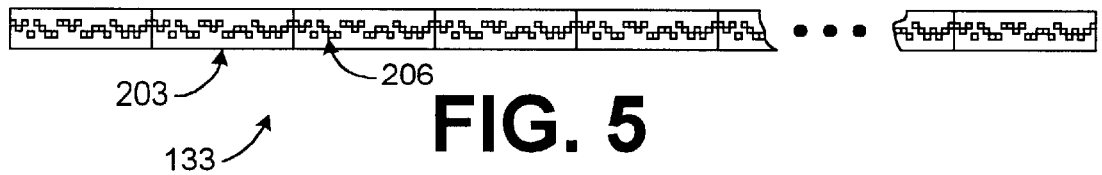
FIG. 5 is a drawing of a nonlinear contact image sensor employed in the scanning system of FIG. 1 according to an embodiment of the present invention.

Turning to FIG. 5, shown is a nonlinear CIS 133 according to an embodiment of the present invention. The nonlinear CIS 133 includes a number of nonlinear sensor integrated circuits 203 with a number of sensors 206 arranged in a nonlinear fashion thereon.

Figure 6A:
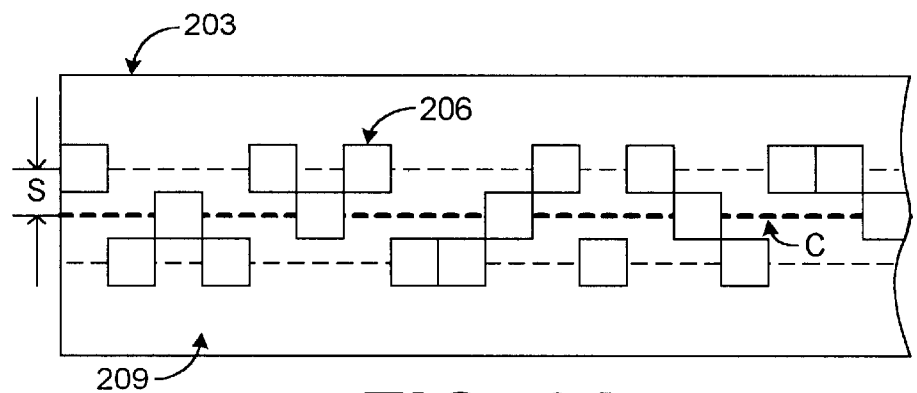
FIG. 6A is a drawing of the nonlinear contact image sensor of FIG. 5.

With reference to FIG. 6A, shown is a portion of a nonlinear sensor integrated circuit 203 with the nonlinear randomized pattern 209 of sensors 206 located thereon. The nonlinear integrated circuit 203 generally includes a centerline C. The sensors 206 are located relative to the centerline C such that they are located either along the centerline, a sensor length S above the centerline C, or a sensor length S below the centerline 209. Thus, each sensor 206 can be placed in one of three locations, although it may be possible that more than three locations may be employed. The nonlinear randomized pattern 209 of sensors 206 is random pattern in that the location chosen for each sensor 206 of the three possible is chosen at random. It would be possible to specify a pattern that is not random, but is still nonlinear as will be discussed. However, for the best results, a nonlinear, random pattern as discussed herein should be employed. Note that the sensors 206 each uniquely define a single scan width in that they sense the reflected light 129 (FIG. 1) from a unique column traced on the scan target 126 (FIG. 1) as it is fed past the CIS 133 in the scanning motion 136 (FIG. 1).

Figure 6B:
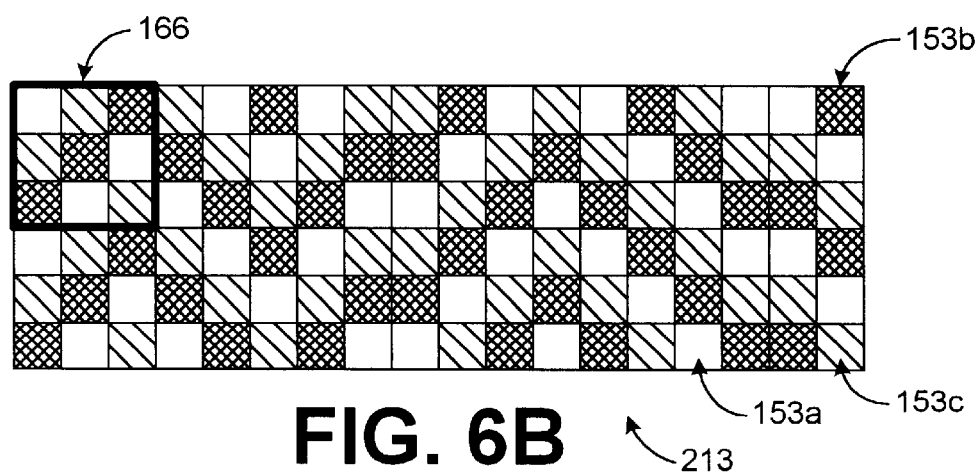
FIG. 6B is a drawing of a nonlinear pattern of sensor spots generated by the nonlinear contact sensor of FIG. 6A.

Referring to FIG. 6B, when the nonlinear CIS 133 is employed in the scanning system 100 (FIG. 1) to generate an image from a scan target 126 (FIG. 1), a resulting pattern 213 of sensor spots 153 results. In particular, the pattern includes red sensor spots 153a in which red light was sensed, blue sensor spots 153b from blue light, and green sensor spots 153c from green light. The sensor spots 153a–c are obtained as the scan target 16 is advanced during the scanning process. Note that the particular sensor spots 153a–c indicated are exemplary of the many sensor spots 153a–c shown. The pixel(s) 166 of a resulting image are constructed by averaging the sensor spots 153a–c of the same color within the respective pixels 166 to obtain resulting red, blue, and green color components that are generalized to the whole pixel 166.

Figure 7:
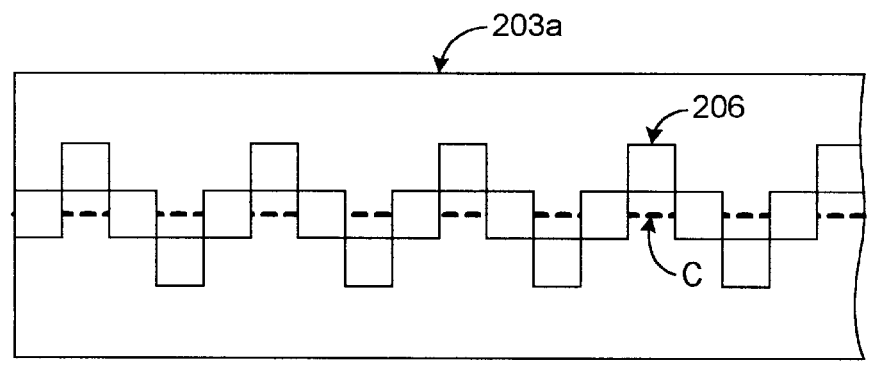
FIG. 7 is a drawing of a second nonlinear contact image sensor according to another embodiment of the present invention.

Turning to FIG. 7, shown is a portion of a second nonlinear sensor integrated circuit 203a with the nonlinear arrangement of sensors 206 located thereon. The arrangement of the sensors in the nonlinear sensor integrated circuit 203a form an oscillating pattern as shown. The oscillating pattern may be problematic in that some diagonal lines with a particular slope on the scan target 126 (FIG. 1) may appear with the same color aberrations as discussed with reference to FIG. 4.

Figure 8A:
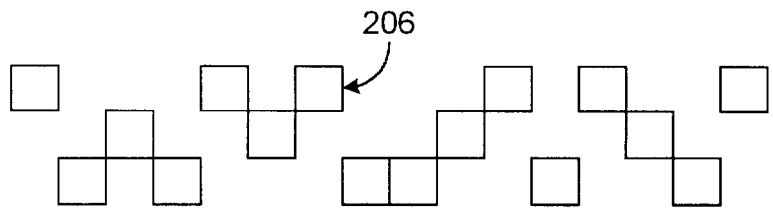
FIG. 8A is a drawing of a nonlinear pattern of the sensors employed in the nonlinear contact image sensor of FIG. 6A.

With reference to FIG. 8A, shown is the nonlinear randomized pattern 209 of sensors 206 as discussed previously. When the nonlinear CIS 133 with the randomized pattern 209 is employed, the nonlinear CIS 133 receives a serial string of values each time the sensors 206 are sampled in a row. This presents a problem in that the values sampled from the sensors 206 do not indicate the positions of the originating sensors 206 relative to the centerline C of the nonlinear sensor integrated circuit 203 (FIG. 6A).

Figure 8B:
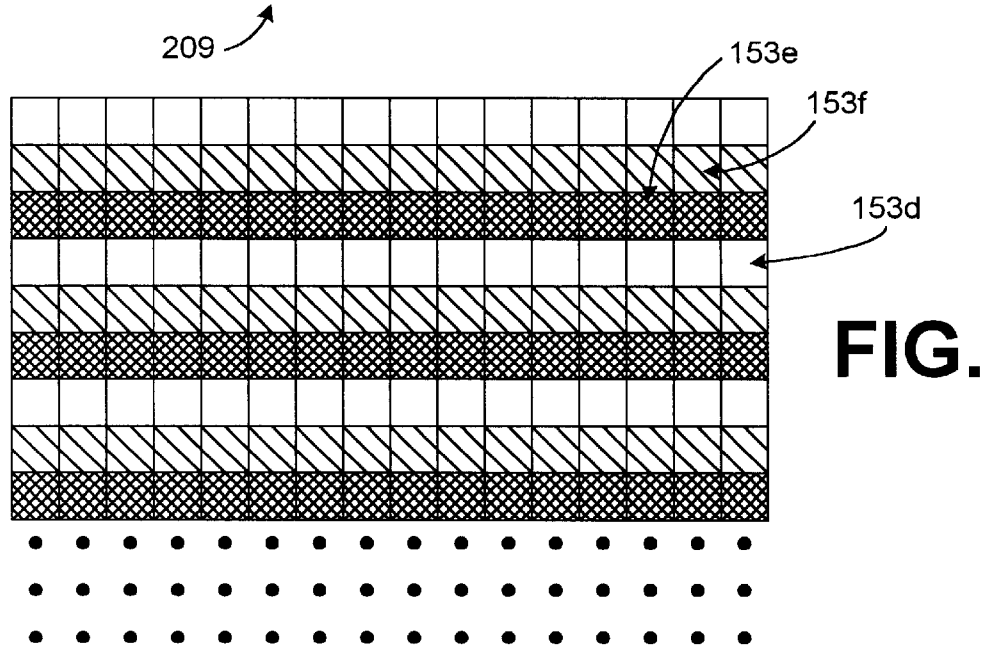
FIG. 8B is a drawing of a pattern of sensor spots obtained from the nonlinear contact image sensor of FIG. 6A, where the sensor spots are out of position.

In particular, the sampled values are generally stored in memory 106 (FIG. 1). The position in the memory 106 indicates the particular location of a sensor spot 153 in an image from the scan target 126. However, the serial output of the nonlinear CIS 133 that is stored directly to memory 106 appears as shown in FIG. 8B. Given that a location of a particular sensor spot 153 in the scan target 126 corresponds to a particular memory address, the orientation of sensor spots 153 stored in memory as shown in FIG. 8B will not correspond to the image orientation. Were an image to be created directly from the sensor spots 153 stored in this manner, it would suffer some distortion as the location of the various sensor spots 153d, 153e, and 153f of the image would not reflect their relative positions when sampled via the sensors 206.

Figure 8C:
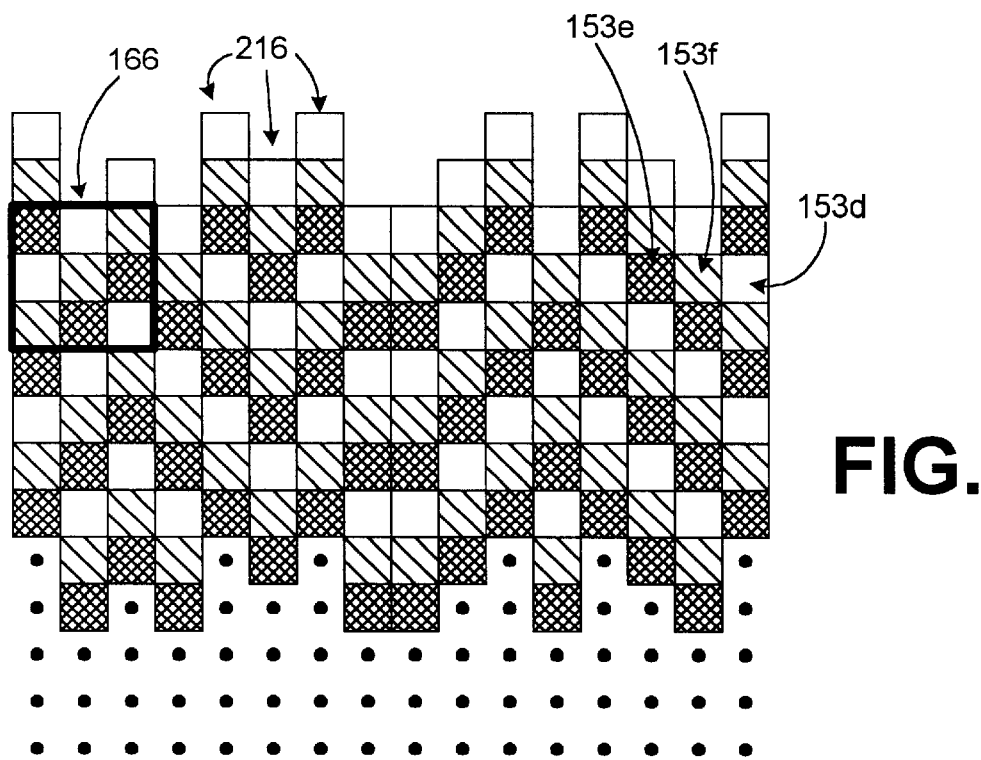
FIG. 8C is a drawing of the pattern of sensor spots of FIG. 8B, the sensor spots being rearranged to match an image orientation of the sensor spots.

To correct the dislocated sensor spots 153d–f, the memory locations holding the columns 216 are rearranged or shifted by an appropriate amount in memory 106 as shown in FIG. 8C. In this manner, the sensor spots 153d–f are stored in memory 106 according to their relative positions on the scan target 126. By knowing the pattern 209, the locations of the various colors of sensor spots 153d–f can be identified. The pixels 166 of the image scanned from the scan target 126 may then be created from the sensor spots 153 for display. Note, however, that the leading and trailing rows of sensor spots 153 are missing values due to the nature of the random pattern 209, and, consequently, they are eliminated when the image is generated. To ensure that the elimination of the leading and trailing rows do not effect the image generated, the sampling of the scan target can begin before and end beyond the scan target itself.

Alternatively, the serial values may be stored in the memory 106 in their appropriate position so that the shifting function above is not necessary. In order to do this, a pointer that generates appropriate memory addresses relative to each of the sensor spots 153a–c based upon the nonlinear randomized pattern 209 may be employed, thus eliminating the necessity of rearranging or shifting the sensor spots 206 once stored in memory 106.

Figure 9:
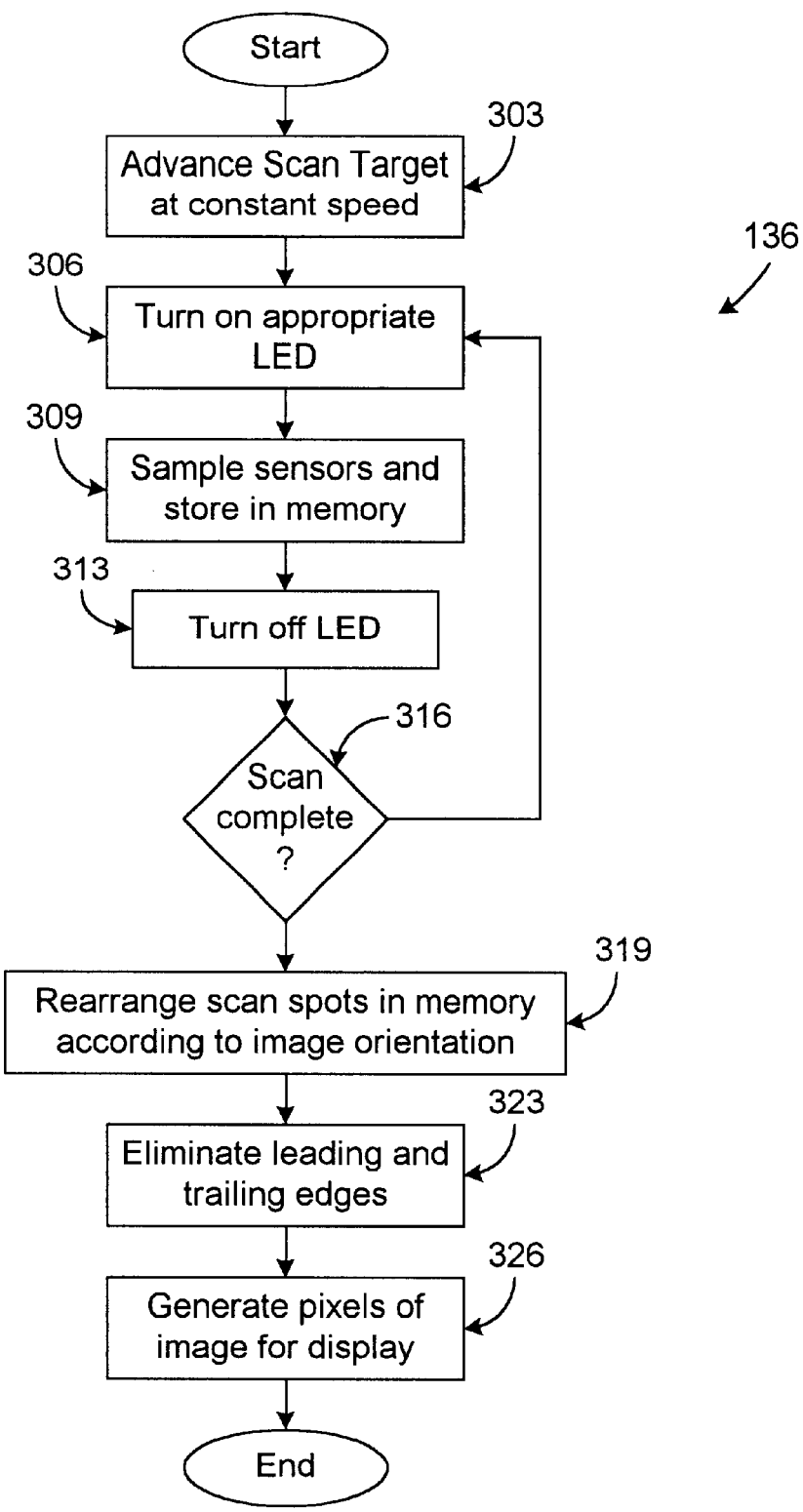
FIG. 9 is a flow chart of scanning logic executed by the scanning system of FIG. 1.

Turning then, to FIG. 9, shown is scanning logic 136 according to another embodiment of the invention. Beginning with block 303 the scanning logic 136 begins advancing the scan target 126 (FIG. 1) across the CIS 133 (FIG. 1) by actuating drive motors, etc. Then, in block 306, one of the three light sources 119 is illuminated depending upon which color is to be acquired from the sensors 206. Thereafter, in block 309, the sensors 206 are sampled and the values obtained therefrom are stored in the memory 106 in a sequential manner, without regard for the image orientation of the sensor spots 153. Then, in block 313, the illuminated light source 119 is turned off.

The scanning logic 136 determines whether the scan of the scan target 126 is complete in block 316. If not, then the scanning logic 136 reverts back to block 306 where the next colored light source 119 is illuminated to sample the sensors 306 once more. If the scan of the scan target 126 is complete in block 316, then the scanning logic 136 progresses to block 319. In block 319, the scanning logic 136 rearranges the sensor spots 153 stored in the memory 106 according to the image orientation so that the memory locations of the sensor spots 153 reflect the relative positions of the same sensor spots 153 in the scan target 126. Next, in block 323, the leading and trailing rows of the image are eliminated as they lack color information as discussed relative to FIG. 8C.

Finally, in block 326, the scanning logic 136 generates pixels for display on an appropriate display device or printing device. Note that the pixels may be of any resolution greater than nine sensor spots 153 as shown herein.

Alternatively, in step 309, the sensor spots 153 sampled from the sensors 206 may be stored in memory locations that correspond to the image orientation. This may be performed, for example, using an address pointer that generates memory addresses for storage based upon the randomized pattern 209 of the sensors 206 on the nonlinear CIS 133. Note, if the sensor spots 153 are stored in the memory 106 in this manner, then the sensor spots 153 need not be rearranged in block 319.

In addition, the scanning logic 136 of the present invention can be implemented in hardware, software, firmware, or a combination thereof In the preferred embodiment(s), the scanning logic 136 is implemented in software or firmware that is stored in a memory and that is executed by a suitable instruction execution system. If implemented in hardware, as in an alternative embodiment, the scanning logic 136 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Also, the flow chart of FIG. 9 shows the architecture, functionality, and operation of a possible implementation of the scanning logic 136. In this regard, each block represents a module, segment, or portion of code, which comprises one or more executable instructions for implementing the specified logical function(s). It should also be noted that in some alternative implementations, the functions noted in the blocks may occur out of the order noted in FIG. 9. For example, two blocks shown in succession in FIG. 9 may in fact be executed substantially concurrently or the blocks may sometimes be executed in the reverse order, depending upon the functionality involved.

Finally, the scanning logic 136, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A system in a scanner for generating a number of sensor spots from a scan target to create a digital image therefrom, comprising:

a plurality of light sources positioned to project light at the scan target; and a contact image sensor comprising at least one sensor integrated circuit, the at least one sensor integrated circuit having a number of sensors positioned to receive reflected light from the scan target, the sensors within the at least one sensor integrated circuit being arranged in a nonlinear pattern, wherein the nonlinear pattern is a random pattern.

2. The system of claim 1, further comprising sampling circuitry to generate a number of digital values associated with a color of a number of pixels from the scan target during a scanning operation.

3. A system in a scanner for generating a number of sensor spots from a scan target to create a digital image therefrom, comprising:

a means for projecting an amount of light from one of a number of light sources at the scan target; and a contact image sensor comprising at least one sensor integrated circuit, the at least one sensor integrated circuit having a number of sensors positioned to receive an amount of reflected light from the scan target, the sensors within the at least one sensor integrated circuit being arranged in a nonlinear pattern, wherein the nonlinear pattern is a random pattern.

4. The system of claim 3, further comprising sampling means for generating a number of digital values associated with a color of a number of pixels from the scan target during a scanning operation.

5. A method in a scanner for generating a number of sensor spots from a scan target to create a digital image therefrom, comprising the steps of:

projecting an amount of light from one of a number of light sources at the scan target;

receiving an amount of reflected light from the scan target in a contact image sensor comprising at least one sensor integrated circuit, the at least one sensor integrated circuit having a number of sensors, the number of sensors being arranged in a nonlinear pattern within the at least one sensor integrated circuit; and providing for an arrangement of the number of sensors in a random pattern.

6. The method of claim 5, further comprising generating a number of digital values associated with a color of a number of pixels from the scan target during a scanning operation.

7. The system of claim 1, wherein a select number of the sensors are located a predefined distance from a centerline associated with the at least one sensor integrated circuit.

8. The system of claim 1, wherein a select number of the sensors are located on a centerline associated with the at least one sensor integrated circuit.

9. The system of claim 3, wherein a select number of the sensors are located a predefined distance from a centerline associated with the at least one sensor integrated circuit.

10. The system of claim 3, wherein a select number of the sensors are located on a centerline associated with the at least one sensor integrated circuit.

11. The method of claim 5, providing for a location of a select number of the sensors a predefined distance from a centerline associated with the at least one sensor integrated circuit.

12. The method of claims 5, providing for a location of a select number of the sensors on a centerline associated with the at least one sensor integrated circuit.

* * * * *